Nov. 28, 1961  D. E. WILSON  3,010,356
VIEWER FOR TELEVISION
Filed Feb. 15, 1961
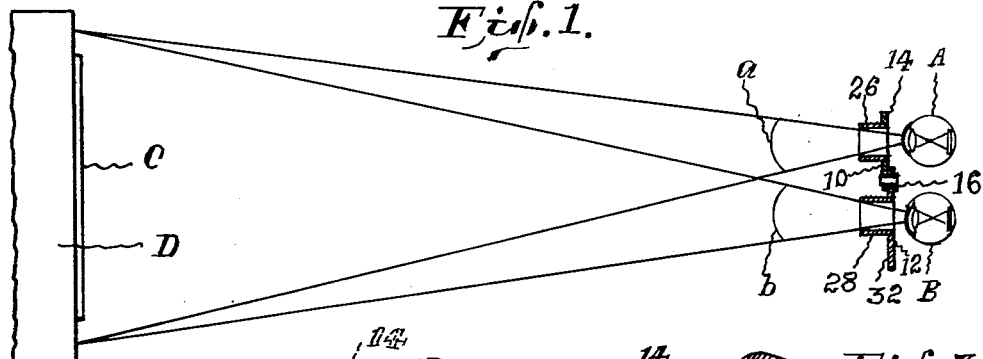
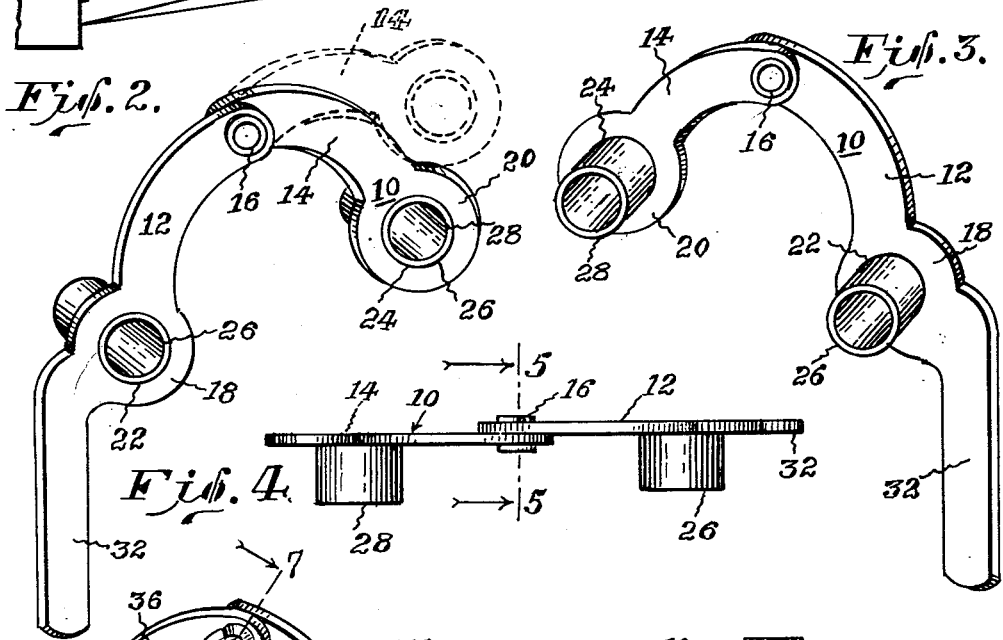
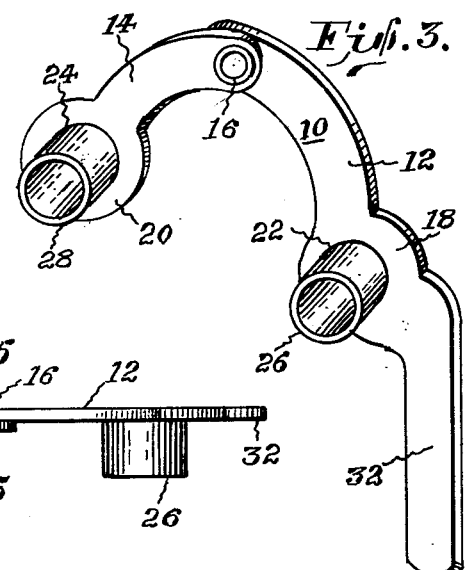
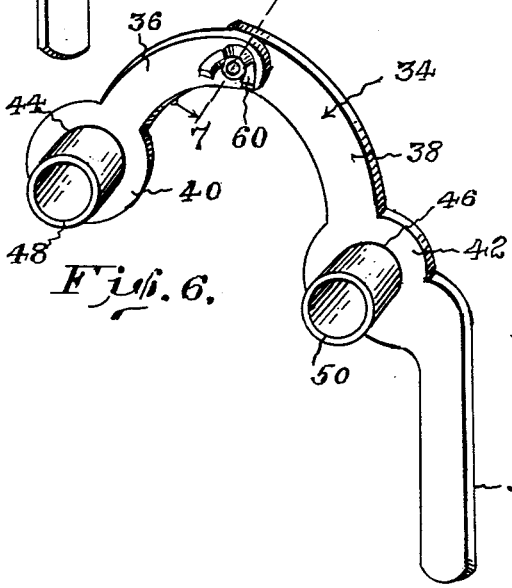
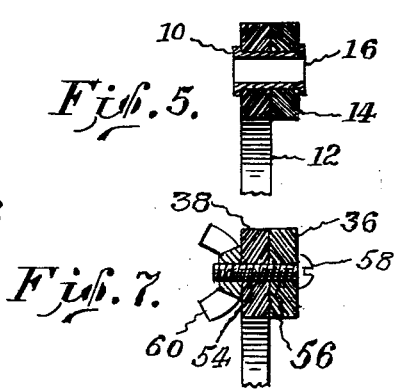
INVENTOR.
David E. Wilson.
BY
Mason, Mason & Albright.

United States Patent Office 3,010,356
Patented Nov. 28, 1961

3,010,356
VIEWER FOR TELEVISION
David E. Wilson, 3210 1st Road N., Arlington, Va.
Filed Feb. 15, 1961, Ser. No. 89,410
4 Claims. (Cl. 88—1)

This invention relates to a device for assisting in the viewing of a scene or other representation on a television screen.

One of the principal objects of the invention is the provision of a device for shutting off side lighting effects and extraneous objects from the eyes of a viewer of a television screen.

Another object is the provision of a device having tubes which confine the view of each eye of an observer to the entire width of the television screen.

A further object is the provision of a television viewer provided with viewing tubes and having means for adjusting the distance between the viewing tubes whereby to permit persons having eyes set apart different distances to use the device, and wherein the picture becomes a single view.

Yet another object is to provide a viewer having viewing tubes for preventing eye strain by shutting out extraneous light rays.

An additional object is to provide a viewing device of the type that may be quickly and cheaply manufactured from sheet plastic material, and which is readily adaptable for quantity production using mass production methods as by stamping the principal parts from sheet plastic material.

Other objects will appear hereinafter throughout the specification.

In the drawings:

FIGURE 1 is a diagrammatic view, partly in horizontal section and partly broken away, of the viewer of this invention and of a television set;

FIGURE 2 is a perspective front view of the device;

FIGURE 3 is a perspective rear view of the device;

FIGURE 4 is a top plan view of the device shown in FIGURE 3;

FIGURE 5 is a sectional view, partly broken away, taken on the line 5—5 of FIGURE 4;

FIGURE 6 is a perspective rear view of a modified form of the invention; and

FIGURE 7 is a sectional view, partly broken away, taken on the line 7—7 of FIGURE 6.

Referring now to the drawings, the numeral 10 shows the device as a whole. As seen in FIGURES 1 to 4, such viewing device comprises a pair of curved arcuate arms 12 and 14, frictionally pivotally connected to each other by a rivet 16, the opposite ends of which have been clinched tightly to provide a tight frictional fit. This permits the arms to be manually adjusted with relation to each other, but prevents free pivotal movements of these arms.

Spaced equi-distant from the pivotal rivet 16, said arms are provided with semi-circular ends or enlarged portions 18 and 20 having apertures 22 and 24 respectively for the reception of tubes 26 and 28. The tubes 26 and 28 are preferably held in the apertures by a tight friction fit which reduces the cost of manufacture. They may also be held in place by an adhesive or by partially melting the tube or material forming the aperture, as I prefer to construct the arms and tubes of plastic material, such as, for example, acrylic nitrile, Lucite or other similar plastisoidal material.

The arm 12 is provided with an integral extension 32 preferably of the same plastic material as its arm 12, forming a handle.

As will be seen by reference to FIGURE 1 the angle of vision from the right eye A of an observer is restricted as shown by the truncated cone $a$, and the angle of vision of the left eye B is restricted as shown by the truncated cone $b$.

It will therefore be noticed that the bases of the cones $a$ and $b$ are the same and that they cover the width of the screen C of the television set D.

In the form shown in FIGURES 6 and 7, the rivet has been replaced by an adjustable wing nut mounted on a screw whereby the tension or frictional force may be manually adjusted during use of the viewing device.

In these figures, 34 indicates the device as a whole, the same being provided with arcuate arms 36 and 38. The enlarged semi-circular arm ends are indicated at 40 and 42 having apertures at 44 and 46 for supporting the tubes 48 and 50. The numeral 52 shows the handle located at the free end of arm 38. The inner ends of the arms are provided with openings 54 and 56 for the reception of a headed screw 58 upon which has been threaded a wing nut 60.

All parts except the rivet of FIGURES 1–4 and the screw and nut of FIGURES 6 and 7 are preferably made from sheet plastic material. The cylinders or tubes 26, 28 of FIGURES 1–4, and 48, 50 of FIGURES 5 to 7 are open cylinders without lenses of any kind and are preferably composed of the same type of plastic material as the arms 12, 14 or 36, 38. They may be fabricated by any suitable known methods, as by cutting from plastic sheet material, rolling to cylindrical form, fusing the abutting ends to form tubes, then cutting the tubes to proper length. Alternately, they may be made by an extrusion process or other well known processes. The screw and wing nut construction of the second form permits a fine frictional adjustment between the arms 34, 36.

As indicated above the tubes are fitted into the apertures in the ends of the arms by providing a tight frictional fit between the exterior diameter of each tube and the apertures in the arms which have been provided to receive them.

The device of this invention is directed primarily to a viewing device that has utility, in that when used in viewing a television screen, it shuts out objects that present themselves on either side of a television screen, such as wall pictures, chairs, tables, etc. located on either side of the television set. Particularly its function is to shut out rays of light either natural or artificial that subject the eyes of an observer to strain when viewing a television screen.

The television viewer herein shown and described may be cheaply made, as it may be readily manufactured in quantity from easily obtainable cheap materials. Hence the viewer may be used in advertising other products, such as breakfast foods, other types of foods, and commodities that lend themselves to a type of advertising where the payment of a small sum of money, plus one or more cereal box tops or container labels, will entitle the sender to a television viewer of this invention by forwarding the same to the food or other commodity manufacturer, thus acting as a sales stimulant of the manufacturer's products.

The above description and drawings disclose several embodiments of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

I claim:

1. A television viewer comprising a pair of curved arms having ends, means comprising a frictional pivotal connection located adjacent one end of each arm for frictionally connecting one end of one arm to one end of the other arm whereby to permit relative manual adjustment between said arms, a cylindrical aperture located at the opposite end of each arm from its pivot, and an elongated substantially opaque cylindrical tube secured in each arm aperture, the interior of each tube providing an unobstructed passageway, the interior of each viewing tube being on the order of the size of the scleral portion of the eyes, with the length of each viewing tube approximately the same, said frictional connection providing a means for adjusting said arms whereby said tubes may be manually adjusted to take care of the proper pupillary position of the eyes of different persons to provide an unobstructed view of a television screen and to shut out side lights when viewing the same, said tubes being of sufficient length and of a diameter to eliminate side rays when said viewer is held before the eyes without permitting a view of extraneous objects, one end of each tube being substantially co-planar with one of the face surfaces of its arm, and an integral downwardly extending handle forming an extension of one of said arms.

2. The structure of claim 1 wherein said pivotal connection comprises a rivet.

3. The structure of claim 1 wherein said pivotal connection comprises a screw and nut.

4. The structure of claim 1 wherein said pivotal connection comprises a screw and wing nut.

References Cited in the file of this patent

UNITED STATES PATENTS

| | | |
|---|---|---|
| 1,141,432 | Stowell | June 1, 1915 |
| 1,236,229 | Stowell | Aug. 7, 1917 |
| 1,480,821 | Henry | Jan. 15, 1924 |
| 2,172,287 | Loy | Sept. 5, 1939 |
| 2,849,917 | Petri | Sept. 2, 1958 |